(12) United States Patent
Nagano et al.

(10) Patent No.: US 6,903,056 B2
(45) Date of Patent: Jun. 7, 2005

(54) FLUID BEARING UNIT AND LUBRICATING OIL COMPOSITION FOR BEARING

(75) Inventors: Katsumi Nagano, Tokyo (JP); Yoshihiko Oeda, Tokyo (JP); Hidenobu Mikami, Mie (JP); Tetsuya Kurimura, Mie (JP)

(73) Assignees: Nippon Steel Chemical Co., Ltd., Tokyo (JP); NTN Corporation, Osaka (JP)

( * ) Notice: Subject to any disclaimer, the term of this patent is extended or adjusted under 35 U.S.C. 154(b) by 113 days.

(21) Appl. No.: 10/326,101

(22) Filed: Dec. 23, 2002

(65) Prior Publication Data

US 2003/0153472 A1 Aug. 14, 2003

(30) Foreign Application Priority Data

Dec. 27, 2001 (JP) ........................................ 2001-396834

(51) Int. Cl.$^7$ .................. C10M 105/36; C10M 129/72; F16C 32/00
(52) U.S. Cl. ...................... 508/496; 508/100; 384/12; 384/13
(58) Field of Search ............................ 508/496; 384/12, 384/13

(56) References Cited

U.S. PATENT DOCUMENTS 2,922,763 A * 1/1960 Tierney ........................ 508/251
5,286,397 A * 2/1994 Schmid et al. ............... 508/496
6,258,762 B1 * 7/2001 Akiyama ...................... 508/462
6,335,310 B1 * 1/2002 Suekuni et al. .............. 508/409

FOREIGN PATENT DOCUMENTS

| JP | 04-357318 | 12/1992 |
| JP | 08-259977 | 10/1996 |
| JP | 2000-063860 | 2/2000 |

* cited by examiner

Primary Examiner—Ellen M. McAvoy
(74) Attorney, Agent, or Firm—Rader, Fishman & Grauer PLLC

(57) ABSTRACT

There is provided a durable low-torque lubricating oil for bearings and fluid dynamic bearings, porous oil-impregnated bearings and hydrodynamic type porous oil-impregnated bearings suitable for use as bearings in small-sized spindle motors for information equipment. The lubricating oil composition comprising (A) a diester of a monovalent aliphatic alcohol containing 6–10 carbon atoms and a saturated aliphatic dicarboxylic acid containing 10 carbon atoms as base oil and (B) 3–20% by weight of a low-viscosity lubricating oil with a kinematic viscosity of less than 11 mm$^2$/s at 40° C., a fluid dynamic pressure bearing unit or a porous oil-impregnated bearing unit containing said lubricating oil composition or a spindle motor provided with said bearing unit.

15 Claims, 5 Drawing Sheets

(a)  (b)

(a)  (b)

(c-1)

(c-2)

(c-3)   (c-4)

FLUID BEARING UNIT AND LUBRICATING OIL COMPOSITION FOR BEARING

FIELD OF THE INVENTION

This invention relates to a lubricating oil composition which is suitable for use in bearings, to a fluid dynamic bearing unit or a porous oil-impregnated bearing unit using said lubricating oil composition and to a spindle motor using said bearing unit.

BACKGROUND OF THE INVENTION

A category of fluid bearings in which the rotary shaft is supported by the film pressure of a lubricating oil interposed in a clearance between the outer peripheral surface of the shaft and the inner peripheral surface of the sleeve includes the following bearings: a fluid dynamic bearing in which the hydrodynamic developed by a groove provided either on the outer peripheral surface of the shaft or on the inner peripheral surface of the sleeve forms a film of a lubricating oil to raise and support the sliding surface of the rotary shaft; a porous oil-impregnated bearing in which a porous body of a sintered metal and the like is rendered self-lubricating by impregnation with a lubricating oil or grease and supports the rotary shaft; and a hydrodynamic type porous oil-impregnated bearing which is a porous oil-impregnated bearing provided with a groove for developing hydrodynamic on its bearing surface. They are suitable for use in instruments which are required to be driven at high speed with high rotary precision such as spindle motors in polygone scanner motors of laser beam printers (LBP) and in hard disk drives (HDD) and suitable for instruments which are driven at high speed under the conditions of imbalance loading caused by mounting of a disk such as spindle motors in optical disks like DVD-ROM and DVD-RAM or in magneto optical disks like MO.

In order to meet demands for low-torque bearings in small-sized spindle motors for information equipment, lubricating oils of relatively low viscosity are chosen for fluid dynamic bearings, porous oil-impregnated bearings and hydrodynamic type porous oil-impregnated bearings. Low-viscosity lubricating oils proposed hitherto include hydrocarbon-based PAO (poly-α-olefins), the diesters described in JP92-357318 A, the dialkyl carbonates and polyol esters described in JP96-259977 and the monoesters described in JP2000-63860.

Keeping pace with a growing trend in recent years for higher performance and mobile use in audio-visual and automated office equipment, there is a strong demand for greater speed and smaller size for spindle motors to be installed in the rotary parts of the equipment and, in consequence, always a demand for low-torque bearings in the parts supporting rotation. Factors influencing the torque of a bearing include the clearance and diameter of a bearing and also the viscosity of a lubricating oil is one of such factors.

Lubricating oils generally tend to evaporate more easily as the viscosity decreases. They cannot develop an adequate oil film pressure when they suffer loss by evaporation and the like and the rotary precision deteriorates markedly so that the bearing in use is regarded to have come to the end of its life; hence, the evaporation characteristics of lubricating oils are important properties critically influencing the durability of bearings. It is therefore necessary to select lubricating oils of low viscosity and good low volatility characteristics for lubrication of sleeve bearings such as fluid dynamic bearings, porous oil-impregnated bearings and hydrodynamic type porous oil-impregnated bearings. Ester-based lubricating oils are used as such on many occasions.

Ester-based oils are available in several kinds, differing from one another in viscosity, low volatility characteristics, solubility behavior and the like and, similar to other kinds of lubricating oils, they tend to deteriorate in evaporation characteristics as the viscosity decreases. Therefore, in order to reduce the torque of bearings, a mere selection of ester oils which are lower in viscosity than the existing ones may adversely affect the evaporation characteristics and lower the durability of bearings. For example, a mixture of a low-viscosity oil composed mainly of monoesters and a high-viscosity oil seemingly shows a high viscosity and is expected to evaporate to a small extent; however, selective evaporation of low molecular weight ingredients decreases the amount of oil or selective intrusion of low molecular weight ingredients into the lubricating surface decreases the rigidity of bearings. When diesters are used, it is possible to obtain low-viscosity lubricating oils by adequate selection of the molecular weight. In the case of diesters with a viscosity of 10 $mm^2/s$ or less at 40° C., however, the amount of evaporation increases as the molecular weight decreases and, at the same time, evaporation occurs nearly all at once because of the uniformity of molecular weight. Thus, the durability deteriorates rapidly when the conditions are off the boundary of the specified ones.

SUMMARY OF THE INVENTION

An object of this invention is to provide a lubricating oil of low viscosity and good evaporation characteristics and to provide a bearing of low torque and long life by the use of said lubricating oil.

A lubricating oil composition comprising an ester of a dicarboxylic acid containing 10 carbon atoms as main ingredient and a low-viscosity lubricating oil (may be referred to as sub-ingredient) with a viscosity (kinematic viscosity) of less than 11 $mm^2/s$ at 40° C. as subsidiary ingredient has been found to solve the aforementioned problems.

This invention relates to a lubricating oil composition which comprises (A) an ester of an alcohol and a dicarboxylic acid containing 10 carbon atoms as base oil and (B) 3–20% by weight of a low-viscosity oil exhibiting a kinematic viscosity of less than 11 $mm^2/s$ at 40° C. Preferably, the base oil (A) is an ester of an alcohol containing 8 carbon atoms and a dicarboxylic acid containing 10 carbon atoms and the low-viscosity lubricating oil (B) shows a flash point of 150° C. or above or is based on dioctyl azalate.

Moreover, this invention relates to a lubricating oil composition comprising (A) a diester of a monovalent saturated aliphatic alcohol containing 6–10 carbon atoms and a saturated aliphatic dicarboxylic acid containing 10 carbon atoms as base oil and (B) 3–20% by weight of a low-viscosity lubricating oil exhibiting a kinematic viscosity of less than 11 $mm^2/s$ at 40° C.

Furthermore, this invention relates to a fluid dynamic bearing unit which is provided with a groove for developing hydrodynamic either on the outer peripheral surface of the shaft or on the inner peripheral surface of the sleeve and uses the aforementioned lubricating oil composition as lubricant. Furthermore, this invention relates to a porous oil-impregnated bearing unit or a porous oil-impregnated bearing in which the bearing unit or the bearing is impregnated with the aforementioned lubricating oil composition. Here, a preferred example of a porous oil-impregnated bearing is the one of hydrodynamic type. Still further, this invention relates to a spindle motor provided with the aforementioned bearing unit.

PREFERRED EMBODIMENTS OF THE INVENTION

This invention will be described in detail with reference to the attached drawings.

Figure 4:
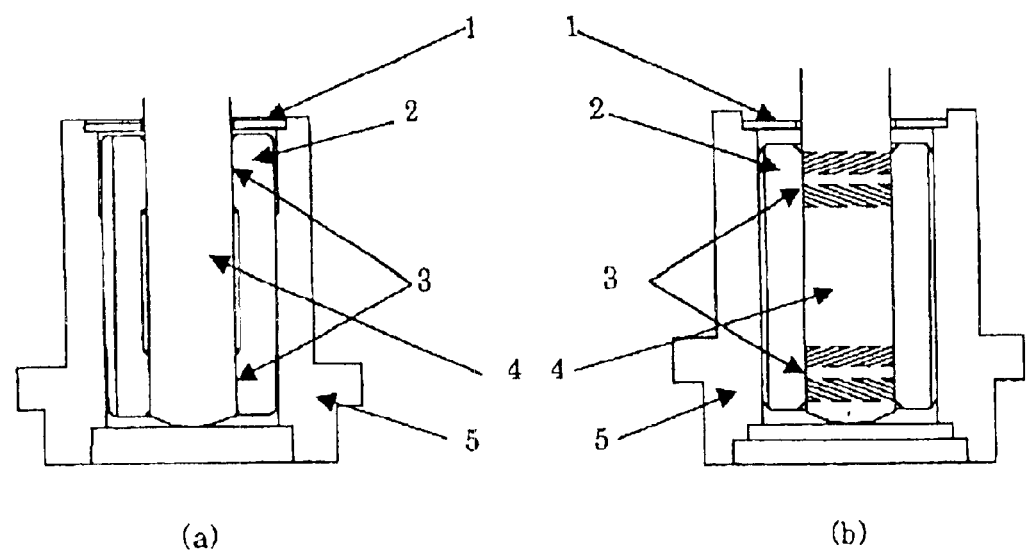
FIG. 4: A cross section of a sintered oil-impregnated bearing unit and that of a dynamic type sintered oil-impregnated bearing unit
Figure 5:
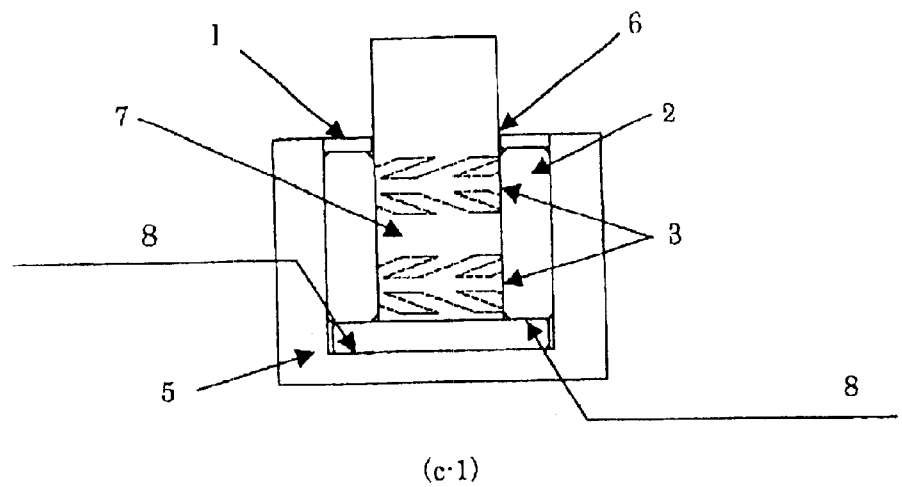
FIG. 5: A cross section of a sintered oil-impregnated bearing unit and that of a dynamic type sintered oil-impregnated bearing unit

FIGS. 4 and 5 are cross sections of a sintered oil-impregnated bearing unit and a hydrodynamic type sintered oil-impregnated bearing unit. In these figures, the numbers designate the following: 1, seal; 2, porous oil-impregnated bearing; 3, radial bearing; 4, shaft; 5, housing; 6, seal clearance; 7, flanged shaft; 8, thrust bearing; 9, cylindrical part of housing; 10, thrust back plate.

Now, a bearing unit of a structure such as shown in FIG. 5($c$-1) will be considered. The unit of this structure is used with the inner space of the housing filled with a lubricating oil.

Figure 6:
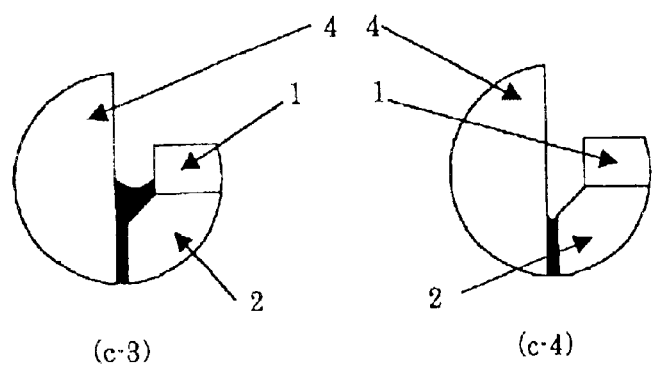
FIG. 6: A cross section of a sintered oil-impregnated bearing unit and that of a dynamic type sintered oil-impregnated bearing unit

The seal in the stationary state is shown magnified in FIG. 6($c$-3). The surface of the lubricating oil stays in the inner periphery of the seal and the surface of the lubricating oil is designed to be always in the inner periphery of the seal under the conceivable conditions such as temperature of use environment and posture. Supposing the surface of the lubricating oil rises above the upper end of the seal, the lubricating oil would naturally leak out of the bearing unit. On the other hand, if the surface of the lubricating oil falls below the lower end of the seal, the lubricating oil to be supplied to the bearing surface gets mixed with air and, as a result, the rotary precision deteriorates and thermal expansion of the air pushes the lubricating oil out from the inside of the bearing unit or causes the lubricating oil to leak out. The aforementioned falling of the surface of the lubricating oil occurs as the lubricating oil evaporates. Therefore, the following care should be exercised in designing; the time for the surface of the lubricating oil to change from the condition shown in FIG. 6($c$-3) to that shown in FIG. 6($c$-4) due to evaporation at the lowest use temperature (that is, the condition under which the volume of the lubricating oil becomes the smallest and the surface is at the lowest position) should be made longer than the durability time required for the bearing unit as a whole.

Figure 7:
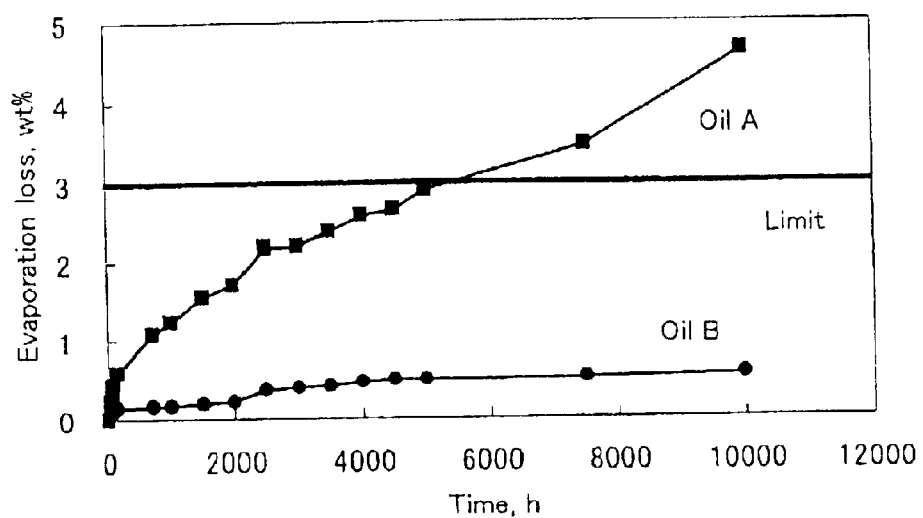
FIG. 7: A graph illustrating the relationship between the evaporation characteristics and the durable time of lubricating oil compositions

Assuming that the lubricating oil suffers a loss of 3% by weight during the change from the condition shown in FIG. 6($c$-3) to that shown in FIG. 6($c$-4) due to evaporation at the lowest use temperature of the bearing unit and the durability time required for the unit is 10,000 hours, this requirement for durability cannot be satisfied, as shown in FIG. 7, unless a lubricating oil exhibiting a rate of evaporation of less than 3% by weight when left standing for 10,000 hours is chosen. As noted above, the evaporation characteristics of a lubricating oil and the durability of a bearing unit (or a motor therein incorporated) are interrelated and selection of a lubricating oil of good low volatility characteristics leads to a longer life of a bearing unit.

In addition to bearing clearance and shaft diameter, the viscosity of a lubricating oil is another large factor affecting the torque of a bearing. Reduction of the viscosity of a lubricating oil in use can reduce the resistance to stirring (viscosity resistance) and, in turn, the torque.

Figure 8:
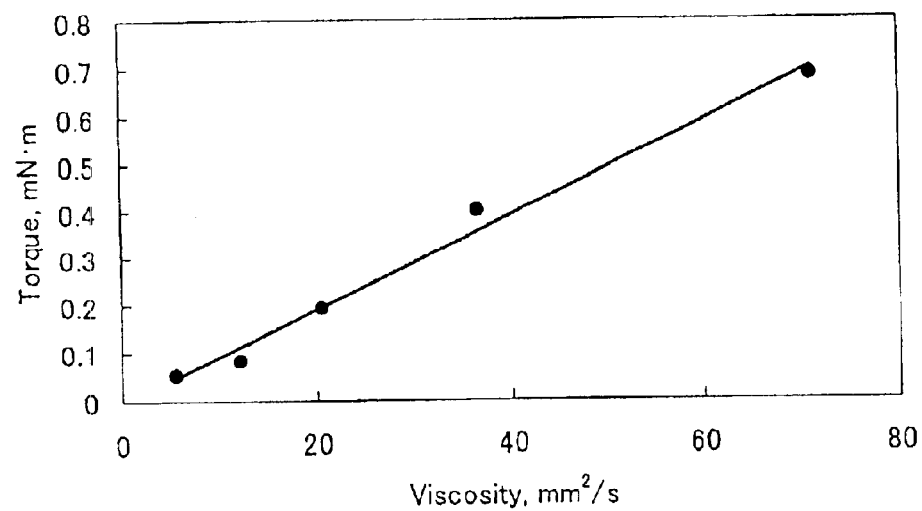
FIG. 8: A graph illustrating the relationship between the torque and the kinematic viscosity

Lubricating oils differing in kinematic viscosity from one another were measured for the torque in a bearing unit of the structure shown in FIG. 5($c$-1) and the results are shown in FIG. 8. The kinematic viscosity is in proportion to the torque as shown in FIG. 8 and it is apparent that reduction of the viscosity of a lubricating oil results directly in reduction of the torque of a bearing unit.

As described above, the problem of providing a bearing unit of low torque and long life can be solved by selecting a lubricating oil of low viscosity and good low volatility characteristics.

An explanation is given below to the lubricating oil composition of this invention.

The base oil which constitutes the main body of the lubricating oil composition is an ester of a dicarboxylic acid containing 10 carbon atoms. An ester of a dicarboxylic acid containing 11 or more carbon atoms produces a higher torque in rotation and does not give a required performance. On the other hand, with the use of an ester of a dicarboxylic acid containing 9 or less carbon atoms, the amount of evaporation increases rapidly and it is not possible to realize a long life for spindle motors. It is therefore necessary to make an ester of a dicarboxylic acid containing 10 carbon atoms the main ingredient. Sebacic acid which is a straight-chain saturated fatty acid is suitable for such a dicarboxylic acid containing 10 carbon atoms.

An alcohol to be used for the formation of an ester with the aforementioned dicarboxylic acid containing 10 carbon atoms is a monovalent aliphatic alcohol containing 6–10 carbon atoms, preferably octyl alcohol. Concretely, 2-ethylhexyl alcohol is preferred. The aforementioned alcohol exhibits a high viscosity index, a high flash point and good low-temperature fluidity because of its relatively straight-chain structure and absence of large branches such as present in polyol esters.

The low-viscosity lubricating oil (subsidiary ingredient) to be incorporated in the base oil is preferably the one with a viscosity of less than 11 $mm^2/s$ at 40° C. and a flash point of 150° C. or above. Incorporation of a lubricating oil with a viscosity of 11 $mm^2/s$ or more at 40° C. makes it difficult to realize low torque while incorporation, even optimal, of a lubricating oil with a flash point of lower than 150° C. is conducive to an increase in evaporation. That is to say, the low-viscosity lubricating oil should desirably be lower in viscosity and molecular weight than the base oil. Therefore, the low-viscosity lubricating oils to be used as subsidiary ingredient, include those substances which satisfy the aforementioned requirement, for example, DOZ (dioctyl azelate), DOA (dioctyl adipate), neopentyl glycol esters, monoesters and PAO (poly-α-olefin). Most preferable among them is DOZ as it is similar in structure to the ester prepared from a dicarbonxylic acid containing 10 carbon atoms and octyl alcohol and is satisfactory in respect to low-temperature fluidity, compatibility and lubricity.

The ratio of the base oil ester to the subsidiary low-viscosity lubricating oil must be controlled so that the low-viscosity lubricating oil accounts for 3–20% by weight of the lubricating oil composition as a whole. When the content of the low-viscosity lubricating oil exceeds 20% by weight, the influence of the subsidiary ingredient intensifies, the amount of evaporation increases and the life of spindle motors cannot be extended. On the other hand, when the content of the low-viscosity lubricating oil is less than 3% by weight, a marked effect of lowering the torque cannot be produced. That is, this invention attains the coexistence of low viscosity and low evaporation, hitherto not fully realized, by mixing the base oil ester and the subsidiary low-viscosity lubricating oil at an optimal ratio. Incorporation of the low-viscosity subsidiary ingredient in an optimal amount selectively introduces the low-molecular-weight subsidiary ingredient to the lubricating surface to realize reduction of the torque while the ester of a dicarboxylic acid containing 10 carbon atoms that is an ingredient to suppress evaporation extends the life of spindle motors.

It is allowable, as occasion demands, to incorporate in the lubricating oil composition of this invention known additives such as oxidation inhibitors, extreme pressure agents, anti-wear agents, rust inhibitors, metal deactivators and oiliness agents.

The lubricating oil composition of this invention is advantageously used in hydrodynamic type sintered oil-impregnated bearings, fluid dynamic bearings, porous oil-impregnated bearings and hydrodynamic type porous oil-impregnated bearings. The lubricating oil composition of this invention exhibits low viscosity and excellent evaporation characteristics and its use leads to reduction of the torque and elongation of the life of bearings to be installed in small-sized spindle motors for information equipment.

EXAMPLES

This invention will be described below with reference to the examples and comparative examples.

Figure 1:
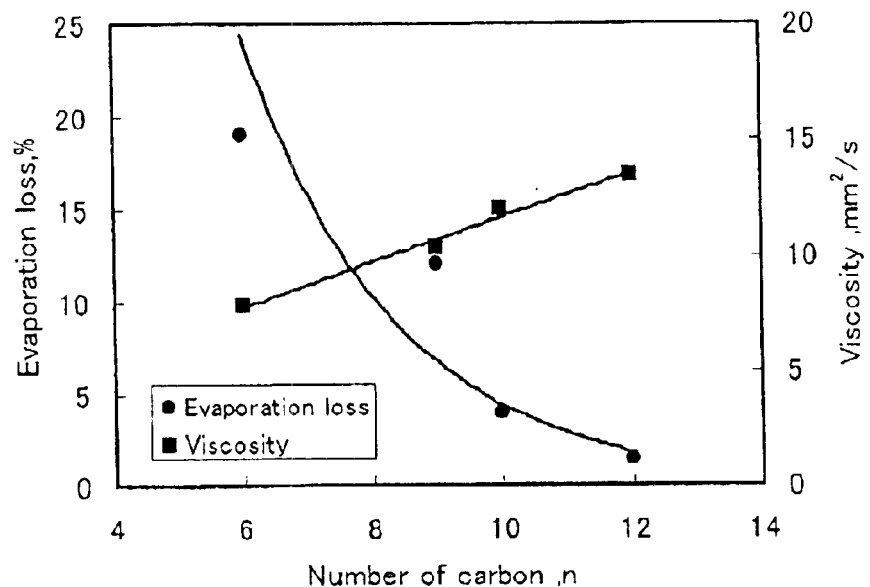
FIG. 1: A graph illustrating the relationship between the number of carbon atoms in dicarboxylic acids and the rate of evaporation or the kinematic viscosity

The diesters shown in Table 1 as base oil and the low-viscosity lubricating oils shown in Table 2 as subsidiary ingredient were used. Lubricating oil compositions were formulated from the base oils, low-viscosity lubricating oils and other additives at the proportions shown in Tables 3–6. Each of the lubricating oil compositions was measured for the rate of evaporation and kinematic viscosity (40° C.) and the results of measurement or evaluation are shown in Tables 3–6 and the results of measurement of the rate of evaporation and kinematic viscosity (40° C.) of the esters of Comparative Examples 1–4 are shown in FIG. 1. In Tables 4–6 are shown the results of evaluation of the rate of evaporation and measurement of the kinematic viscosity (40° C.) for the lubricating oil compositions in which an ester of a dicarboxylic acid containing 10 carbon atoms or di-2-ethylhexyl sebacate was used as base oil and a several kinds of low-viscosity lubricating oils as subsidiary ingredient. It is to be noted that an alkyldiphenylamine as oxidation inhibitor, benzotriazole as metal-deactivator and trioctyl phosphate as anti-wear agent are added in a fixed amount to each of the lubricating oil compositions in the comparative examples and the examples in Table 3–6. In Tables 4–6, the amount in the formulation is part by weight and the remainder (R*) means the amount which remains when the whole lubricating oil composition is taken as 100 parts by weight.

TABLE 1

| Item | C6 | C9 | C10 | C12 |
|---|---|---|---|---|
| Name of compound | Di-2-ethylhexyl adipate | Di-2-ethylhexyl azelate | Di-2-ethylhexyl sebacate | Di-2-ethylhexyl dodecanoate |
| kinematic viscosity mm$^2$/s (40° C.) | 7.8 | 10.4 | 12.0 | 13.5 |
| Flash point ° C. | 204 | 208 | 224 | 228 |

TABLE 2

| Item | PAO3 | POE1 | MP |
|---|---|---|---|
| Name of commercial product | Synfluid 2.5 | HATCOL2957 | 60 Spindle |
| Chemical name | Poly-α-olefin | Neopentyl glycol ester | Naphthenic mineral oil |
| Name of producer | Chevron Phillips Chemical | HATCO | — |
| kinematic viscosity mm$^2$/s (40° C.) | 8.3 | 7.5 | 7.8 |
| Flash point ° C. | 186 | 182 | 140 |

TABLE 3

| | Comparative example | | | | | |
|---|---|---|---|---|---|---|
| Ingredient | 2 | 3 | 4 | 5 | 6 | 7 |
| Amount added | | | | | | |
| C12 | R* | — | — | — | — | — |
| C10 | — | R* | — | — | — | — |
| C9 | — | — | R* | — | — | — |
| C6 | — | — | — | R* | — | — |
| PAO3 | — | — | — | — | R* | — |
| POE1 | — | — | — | — | — | R* |
| MP | — | — | — | — | — | — |
| (Additive) | | | | | | |
| Alkyldiphenylamine | 0.5 | 0.5 | 0.5 | 0.5 | 0.5 | 0.5 |
| Benzotriazole | 0.03 | 0.03 | 0.03 | 0.03 | 0.03 | 0.03 |
| Trioctyl phosphate | 1.0 | 1.0 | 1.0 | 1.0 | 1.0 | 1.0 |
| Evaluation | | | | | | |
| Judgment of rate of evaporation | ◎ | ◎ | X | X | X | X |
| Kinematic viscosity mm$^2$/s | 13.5 | 12.0 | 10.4 | 7.8 | 8.3 | 7.5 |
| Judgment of kinematic viscosity | X | X | ◎ | ◎ | ◎ | ◎ |

R*: Remainder (Note: the last column "7" shows MP as R*, Judgment of rate of evaporation X X, Kinematic viscosity 7.8, Judgment of kinematic viscosity ◎)

TABLE 4

| Ingredient | Example 1 | 2 | 3 | 4 | 5 | 6 | 7 | 8 |
|---|---|---|---|---|---|---|---|---|
| C12 | — | — | — | — | — | — | — | — |
| C10 | R* | R* | R* | R* | R* | R* | R* | R* |
| C9 | 5 | 20 | — | — | — | — | — | — |
| C6 | — | — | 5 | 20 | — | — | — | — |
| PAO3 | — | — | — | — | 5 | 20 | — | — |
| POE1 | — | — | — | — | — | — | 5 | 20 |
| Alkyldiphenylamine | 0.5 | 0.5 | 0.5 | 0.5 | 0.5 | 0.5 | 0.5 | 0.5 |
| Benzotriazole | 0.03 | 0.03 | 0.03 | 0.03 | 0.03 | 0.03 | 0.03 | 0.03 |
| Trioctyl phosphate | 1.0 | 1.0 | 1.0 | 1.0 | 1.0 | 1.0 | 1.0 | 1.0 |
| Evaluation | | | | | | | | |
| Judgment of rate of evaporation | ◎ | ◎ | ○ | ○ | ○ | ○ | ○ | ○ |
| Kineinatic viscosity mm²/s | 11.78 | 11.65 | 11.74 | 11.00 | 11.78 | 10.74 | 11.74 | 10.97 |
| Judgment of kinematic viscosity | ○ | ○ | ○ | ○ | ○ | ○ | ○ | ◎ |

R*: Remainder

TABLE 5

| Ingredient | Comparative example 8 | 9 | 10 | 11 | 12 |
|---|---|---|---|---|---|
| C12 | — | — | — | — | — |
| C10 | R* | R* | R* | R* | R* |
| C9 | 2 | 40 | — | — | — |
| C6 | — | — | 2 | 40 | — |
| PAO3 | — | — | — | — | 2 |
| Alkyldiphenylamine | 0.5 | 0.5 | 0.5 | 0.5 | 0.5 |
| Benzotriazole | 0.03 | 0.03 | 0.03 | 0.03 | 0.03 |
| Trioctyl phosphate | 1.0 | 1.0 | 1.0 | 1.0 | 1.0 |
| Evaluation | | | | | |
| Judgment of rate of evaporation | ○ | X | ○ | X | ○ |
| Kinematic viscosity mm²/s | 11.95 | 11.49 | 11.91 | 10.10 | 11.85 |
| Judgment of kinematic viscosity | X | ○ | X | ◎ | X |

R*: Remainder

TABLE 6

| Ingredient | Comparative example 13 | 14 | 15 | 16 | 17 |
|---|---|---|---|---|---|
| C10 | R* | R* | R* | R* | R* |
| PAO3 | 40 | — | — | — | — |
| POE1 | — | 2 | 40 | — | — |
| MP | — | — | — | 3 | 39 |
| Alkyldiphenylamine | 0.5 | 0.5 | 0.5 | 0.5 | 0.5 |
| Benzotriazole | 0.03 | 0.03 | 0.03 | 0.03 | 0.03 |
| Trioctyl phosphate | 1.0 | 1.0 | 1.0 | 1.0 | 1.0 |
| Evaluation | | | | | |
| Judgment of rate of evaporation | X | ○ | X | X | X X |
| Kinematic viscosity mm²/s | 10.35 | 11.84 | 10.00 | 11.89 | 10.06 |
| Judgment of kinematic viscosity | ◎ | X | ◎ | X | ◎ |

R*: Remainder

The rate of evaporation was measured as follows.
Container: φ37×50
Amount of lubricating oil: 10 g
Temperature at which the specimen is left standing: 120° C. (constant temperature bath)
Time in which the specimen is left standing: 300 h
The rate of decrease in weight from the initial weight is measured and a rate of 5% by weight or less is judged acceptable.
Standard for judgment
◎: less than 2.0% by weight
○: 2.0% by weight or more and less than 5% by weight
X: 5.0% by weight or more (not acceptable)
X X: 10% by weight or more (not acceptable)
The kinematic viscosity was measured in accordance with JIS K 2283 and a kinematic viscosity of 11.8 mm²/s or more at 40° C. was judged not acceptable.
◎: less than 11 mm²/s
○: 11 mm²/s or more and less than 11.8 mm²/s
X: 11.8 mm²/s or more (not acceptable)
The results shown in Table 3 and FIG. 1 indicate that a rapid increase in the rate of evaporation observed in the case of diesters of dicarboxylic acids containing 9 or less carbon atoms necessitates the use of diesters of dicarboxylic acids containing 10 or more carbon atoms. Moreover, the kinematic viscosity at 40° C. decreases as the number of carbon atoms decreases and becomes less than 13 mm²/s in case the number of carbon atoms of the dicarboxylic acid is 10 or less. In the light of this finding, an ester based on a dicarboxylic acid containing 10 carbon atoms is selected as main ingredient because it is satisfactory in respect to both rate of evaporation and kinematic viscosity and the ester is mixed with a lubricating oil which is lower in viscosity than the ester as subsidiary ingredient according to this invention, thereby trying to reduce the kinematic viscosity (40° C.) still further while maintaining the evaporation characteristics of the main ingredient. As for the alcoholic moiety of the ester with a dicarboxylic acid containing 10 carbon atoms, any monovalent alcohol may be used without difficulty and octyl alcohol is preferred from the aspect of viscosity and stability.

The low-viscosity lubricating oil to be used as subsidiary ingredient preferably exhibits a viscosity lower than that of the main ingredient or the aforementioned ester.

The results in Tables 4–6 indicate that the rate of evaporation increases abruptly when the proportion of the subsidiary ingredient or the low-viscosity lubricating oil exceeds 20% by weight, although it depends on the kind of low-viscosity lubricating oil. It is likely that the low-viscosity lubricating oil exerts its influence more strongly because of its higher proportion and volatility to a greater extent. Therefore, the proportion of the low-viscosity lubricating oil should be limited to 20% by weight or less. A lubricating oil composition containing 3% by weight of the low-viscosity lubricating oil shows a viscosity not much different from the one containing 0% by weight, but there are some low-viscosity lubricating oils which can satisfy property requirements for both viscosity and evaporation by incorporation of 3% by weight. The effect is great when both properties are satisfied by incorporation of as low as 3% by weight. In particular, most favorable results were obtained when DOZ based on an alcohol containing 8 carbon atoms was chosen as the subsidiary low-viscosity lubricating oil. DOZ is preferable as subsidiary ingredient from the aspect of low-temperature fluidity, compatibility and lubricity.

Figure 2:
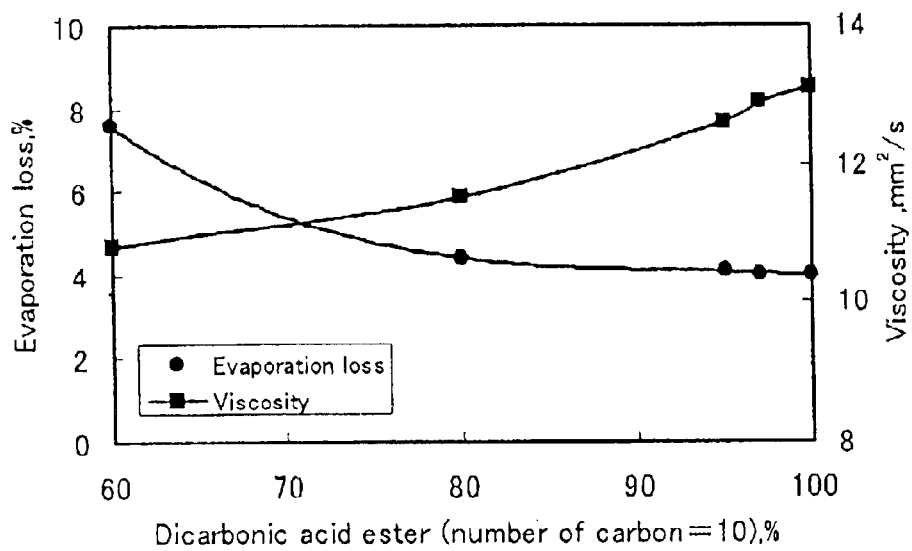
FIG. 2: A graph illustrating the relationship between the content of the base oil and the rate of evaporation or the kinematic viscosity

FIG. 2 is a typical example of the results of measurement of the rate of evaporation and kinematic viscosity of the lubricant which is a mixture of a diester of a dicarboxylic acid containing 10 carbon atoms and DOZ as subsidiary ingredient.

As noted above, the viscosity and evaporation characteristics of the lubricant is interrelated to the torque and durability of the motors in which the bearing units containing said lubricant are incorporated and it is apparent that the motors are given both low torque and long life by the use of the bearing units containing the lubricant of low viscosity and good low volatility characteristics of this invention.

The bearing units to which the lubricating oil of this invention is applicable are the following.

Figure 3:
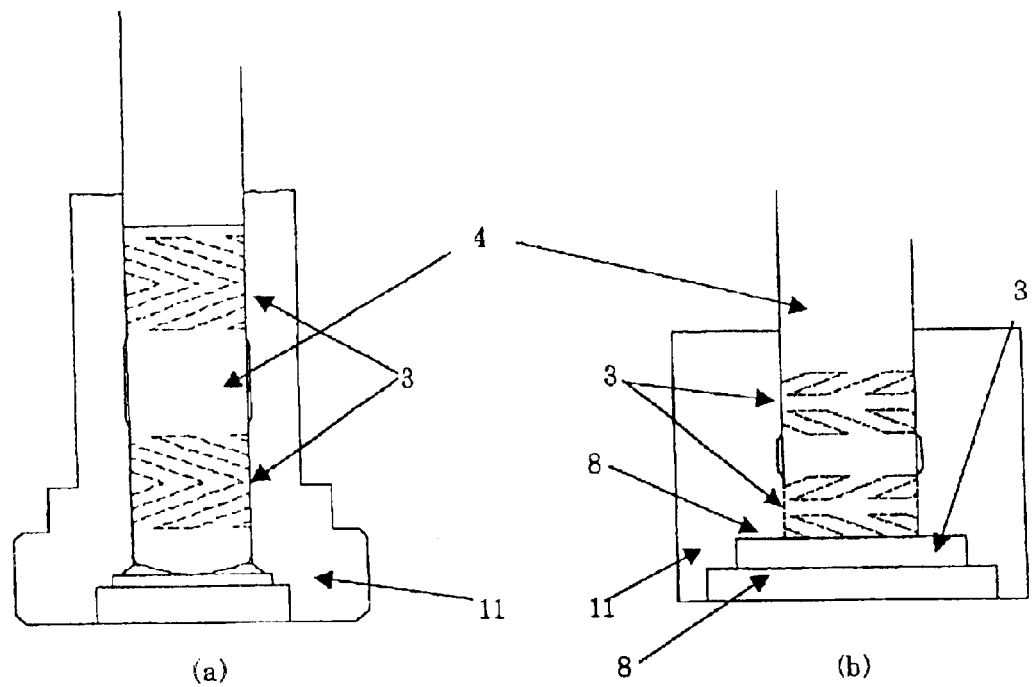
FIG. 3: Cross sections of fluid dynamic bearing units

FIG. 3(a) is a cross section of a fluid dynamic bearing. In this figure, the bearing has a sleeve 11 and the numbers for identifying the parts in FIG. 3 are the same in FIGS. 4 and 5. In the fluid dynamic bearing here, a hydrodynamic groove is provided either on the outer peripheral surface of the shaft or on the inner peripheral surface of the sleeve and the gap between the two surfaces (bearing clearance) is filled with a lubricating oil by a means such as injection and vacuum impregnation; the hydrodynamic of the lubricating oil develops as the shafts rotates and supports the rotation of the shaft in the radial direction. FIG. 3(b) is a cross section of a fluid dynamic bearing of the type which supports the shaft rotating either in the radial or the thrust direction and, structurally, a thrust bearing 8 is added to the unit shown in FIG. 3(a). The thrust bearing is constructed of the flange 3, the sleeve 11 which was fabricated in the shape matching that of the flange 3 and the back plate; a hydrodynamic groove is provided either in the opposing part of the flange and the sleeve or in the opposing part of the flange and the back plate and a lubricating oil is injected to both radial and thrust bearings as in the case of a fluid dynamic bearing shown in FIG. 3(a) thereby developing the hydrodynamic by the action of the rotating shaft and supporting the shaft in both radial and thrust directions. The fluid bearings shown in FIGS. 3(a) and 3(b) are provided with hydrodynamic grooves, but they may be without the hydrodynamic grooves.

FIG. 4 is a cross section of a porous oil-impregnated bearing unit. FIG. 4(a) illustrates a round bearing whose bearing surface is round and FIGS. 4(b), 5(c-1) and 5(c-2) illustrate hydrodynamic type porous oil-impregnated bearing units. The units shown in FIGS. 4(a) and 4(b) are of the type for radial rotation only and, in their use, a porous oil-impregnated bearing 2 prepared in advance by impregnating the inside of the bearing with a lubricating oil is fixed to a housing 5 by forcing, caulking or adhesion, the assembled bearing unit is fixed to a motor and a shaft 4 to which a rotor is fixed is inserted into the inside of the bearing. If necessary, a lubricating oil is injected in an appropriate amount to the inner surface of the bearing before insertion of the shaft. The side of the housing opposite to the rotor is sealed by a backup to prevent oil leakage. A housing whose bottom is shaped like a cup may be used.

The hydrodynamic type sintered oil-impregnated bearing units shown in FIGS. 5(c-1) and 5(c-2) have bearing parts on the inner surface, on the terminal surface on one side and at the bottom of the housing and support a flanged shaft 7 rotating contactless in the radial and axial directions. In this type of bearing unit, the shaft, bearing and seal are assembled in the housing and the unit is impregnated inside with a lubricating oil and incorporated in the motor. The space inside the unit is completely impregnated with a lubricating oil and, because of the absence of residual air inside the unit, an oil film forms continuously in the bearing part during operation thereby maintaining a high rotary precision and eliminating the possibility of oil leakage due to thermal expansion of air. A bearing unit of this type can manifest a high rotary precision in all postures taken while in use and is suited for applications where the spindle motors are used tilted sideways or upside down or in varying postures such as in the case of HDD or handy video cameras. In its use, a bearing unit of this type is fixed as it is to the motor and the rotor is fixed to the tip of the flanged shaft. As illustrated in FIG. 5(c-2), the housing may be separated into two parts, a cylindrical part 9 and a thrust back plate 10.

Figure 9:
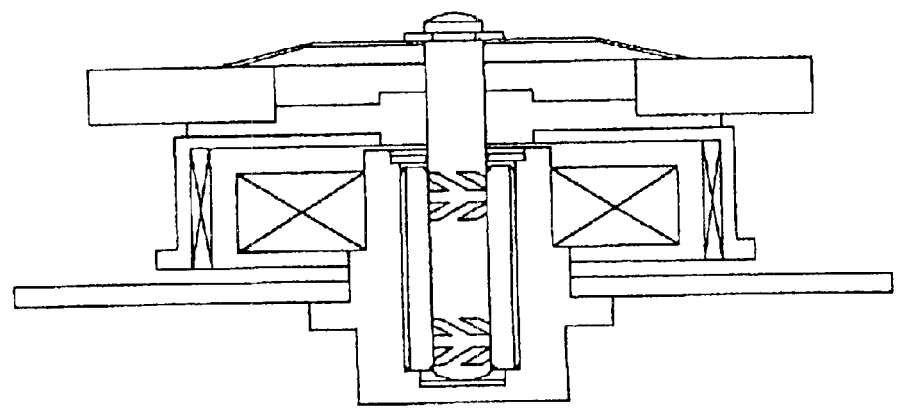
FIG. 9: Across section of a polygone scanner motor
Figure 10:
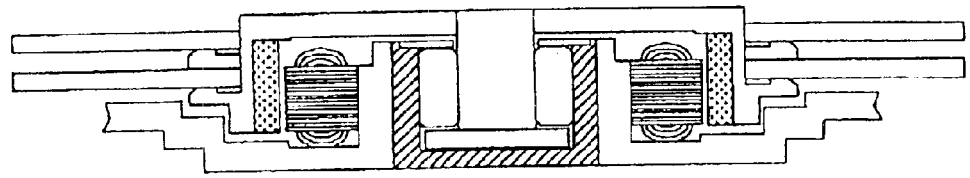
FIG. 10: Across section of an HDD spindle motor
Figure 11:
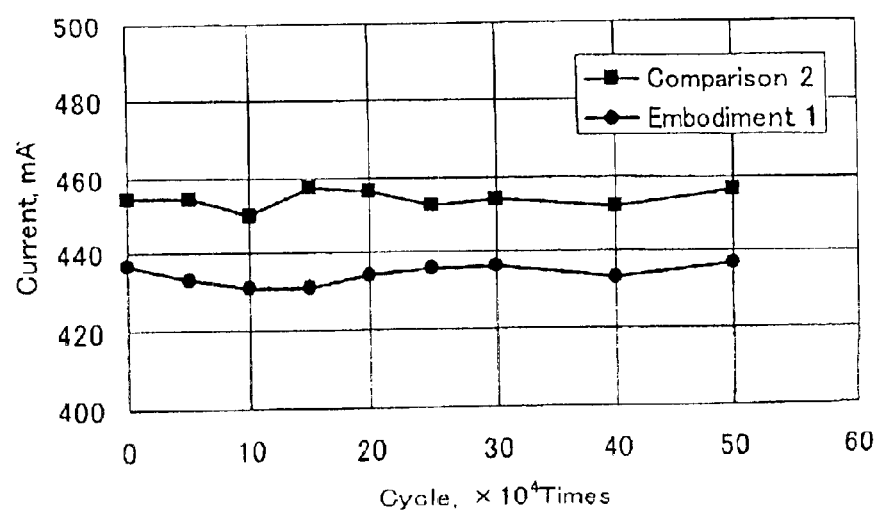
FIG. 11: A graph showing the results of durability test conducted on a polygone scanner motor

As described above, the viscosity and evaporation characteristics of a given lubricating oil is interrelated to the torque and durability of a motor in which a bearing unit containing said lubricating oil is incorporated and this invention proves that a lubricating oil of low viscosity and good low volatility characteristics can give a motor both low torque and long life. To confirm this, an example is shown of the results of durability tests conducted on a spindle motor utilizing the aforementioned bearing unit. FIG. 9 is related to the case where the hydrodynamic type sintered oil-impregnated bearing shown in FIG. 4(b) is mounted on a polygone scanner motor. FIG. 10 is related to the case where the bearing unit illustrated in FIG. 5(c-1) is mounted on an HDD spindle motor. FIG. 11 shows the results of the durability test conducted on the polygone scanner motor illustrated in FIG. 9 under the following conditions.

Conditions for durability test

Lubricating oil: Comparative Example 2, Example 1

Speed of rotation: 30,000 rpm

Temperature of environment: 60° C.

Posture of motor: Inclined 40°

Test period: 500,000 cycles (commercial requirement, 300,000 cycles)

Operating conditions: ON/OFF (1 cycle lasting 36 seconds)

As shown in FIG. 11, the lubricating oil composition of Example 1 gives a lower torque (lower electric current) than that of Comparative Example 2 and satisfies the commercial requirement for durability.

What is claimed is:

1. A lubricating oil composition which comprises (A) an ester of an alcohol and a dicarboxylic acid containing 10 carbon atoms as base oil and (B) 3–20% by weight of a low-viscosity lubricating oil exhibiting a kinematic viscosity of less than 11 mm$^2$/s at 40° C., wherein said low-viscosity lubricating oil is lower in viscosity and molecular weight than said base oil.

2. The lubricating oil composition as described in claim 1, wherein the base oil (A) is an ester of an alcohol containing 8 carbon atoms and a dicarboxylic acid containing 10 carbon atoms.

3. The lubricating oil composition as described in claim 1, wherein the low-viscosity lubricating oil (B) exhibits a flash point of 150° C. or above.

4. The lubricating oil composition as described in claim 1, wherein the low-viscosity lubricating oil is dioctyl azelate.

5. A lubricating oil composition which comprises (A) a diester of a monovalent aliphatic alcohol containing 6–10 carbon atoms and a saturated aliphatic dicarboxylic acid containing 10 carbon atoms as base oil and (B) 3–20% by weight of a low-viscosity lubricating oil exhibiting a kinematic viscosity of less than 11 mm$^2$/s at 40° C., wherein said low-viscosity lubricating oil is lower in viscosity and molecular weight than said base oil.

6. A fluid bearing unit which comprises a bearing supporting the rotary shaft by the pressure of the film of a lubricating oil interposed in a clearance between the outer peripheral surface of the shaft and the inner peripheral surface of the sleeve said lubricating oil comprising the lubricating oil composition as described in claim 1.

7. A fluid dynamic bearing unit which comprises a groove for developing hydrodynamic provided either on the outer peripheral surface of the shaft or on the inner peripheral surface of the sleeve and a lubricant comprising the lubricating oil composition as described in claim 1.

8. A porous oil-impregnated bearing unit which comprises a porous bearing impregnated with the lubricating oil composition as described in claim 1.

9. The porous oil-impregnated bearing unit as described in claim 8, wherein the porous oil-impregnated bearing is of a dynamic type.

10. A porous oil-impregnated bearing which is impregnated with the lubricating oil composition as described in claim 1.

11. The porous oil-impregnated bearing as described in claim 10, wherein the porous oil-impregnated bearing is of a dynamic type.

12. A spindle motor comprising the bearing unit as described in claim 6.

13. The lubricating oil composition as described in claim 1, wherein the base oil (A) is di-2-ethylhexyl sebacate.

14. The lubricating oil composition as described in claim 1, wherein the base oil (A) is di-2-ethylhexyl sebacate and the low-viscosity lubricating oil is dioctyl azelate.

15. The lubricating oil composition as described in claim 1, wherein the base oil (A) exhibits a kinematic viscosity of at least 11 mm$^2$/s at 40° C.

* * * * *